United States Patent

Schumacher et al.

[11] Patent Number: 5,773,900
[45] Date of Patent: Jun. 30, 1998

[54] DEVICE FOR SUPPRESSING SIGNAL INTERFERENCE

[75] Inventors: Hartmut Schumacher, Freiberg; Klaus Oswald, Baltmannsweiler; Norbert Crispin, Ludwigsburg; Martin Daiber, Ostfilern-Ruit, all of Germany

[73] Assignee: Robert Bosch GmbH, Stuttgart, Germany

[21] Appl. No.: 793,285

[22] PCT Filed: Aug. 17, 1995

[86] PCT No.: PCT/DE95/01082

§ 371 Date: May 20, 1997

§ 102(e) Date: May 20, 1997

[87] PCT Pub. No.: WO96/07872

PCT Pub. Date: Mar. 14, 1996

[30] Foreign Application Priority Data

Sep. 10, 1994 [DE] Germany .................. 44 32 229.1

[51] Int. Cl.$^6$ ....................................................... B60L 3/00
[52] U.S. Cl. ................................................................ 307/10.1
[58] Field of Search ..................................... 307/9.1, 10.1, 307/121; 364/424.055–424.057, 571.01; 180/271, 282; 280/734, 735; 340/436, 438, 699; 701/44–46; 324/162

[56] References Cited

U.S. PATENT DOCUMENTS 5,037,129 8/1991 Fritz et al. ............................. 280/735
5,062,065 10/1991 Lampe .................................. 364/571.01

*Primary Examiner*—Richard T. Elms
*Attorney, Agent, or Firm*—Kenyon & Kenyon

[57] ABSTRACT

A device for suppressing interference signals for a microprocessor evaluating a plurality of sensor signals on respective input lines coupled thereto. Each of the input lines is selectively coupled to a first resistance during a measurement interval and selectively coupled to a second resistance during an interval outside of the measurement interval.

4 Claims, 2 Drawing Sheets

DEVICE FOR SUPPRESSING SIGNAL INTERFERENCE

FIELD OF THE INVENTION

The present invention relates to an electronic device.

BACKGROUND INFORMATION

A conventional electronic device is described in U.S. Pat. No. 5,037,129. If sensor signals that are affected by severe interfering signals must be processed in such a conventional device, undesired interference can occur, particularly during a conversion of the analog sensor signals into digital signals. These interferences are perceptible as, for example, "crosstalk," the coupling-in of undesired interfering signal components on adjacent lines or, for example, adjacent channels of a multi-channel analog/digital converter (A/D converter).

SUMMARY OF THE INVENTION

The electronic device of the present invention allows particularly simple and elegant suppression of undesired interfering pulses, so the output signal of a sensor to be processed as a desired measured signal is essentially further processed free from interference; in particular, it can be converted into a corresponding digital output signal.

DETAILED DESCRIPTION OF THE INVENTION

Figure 1:
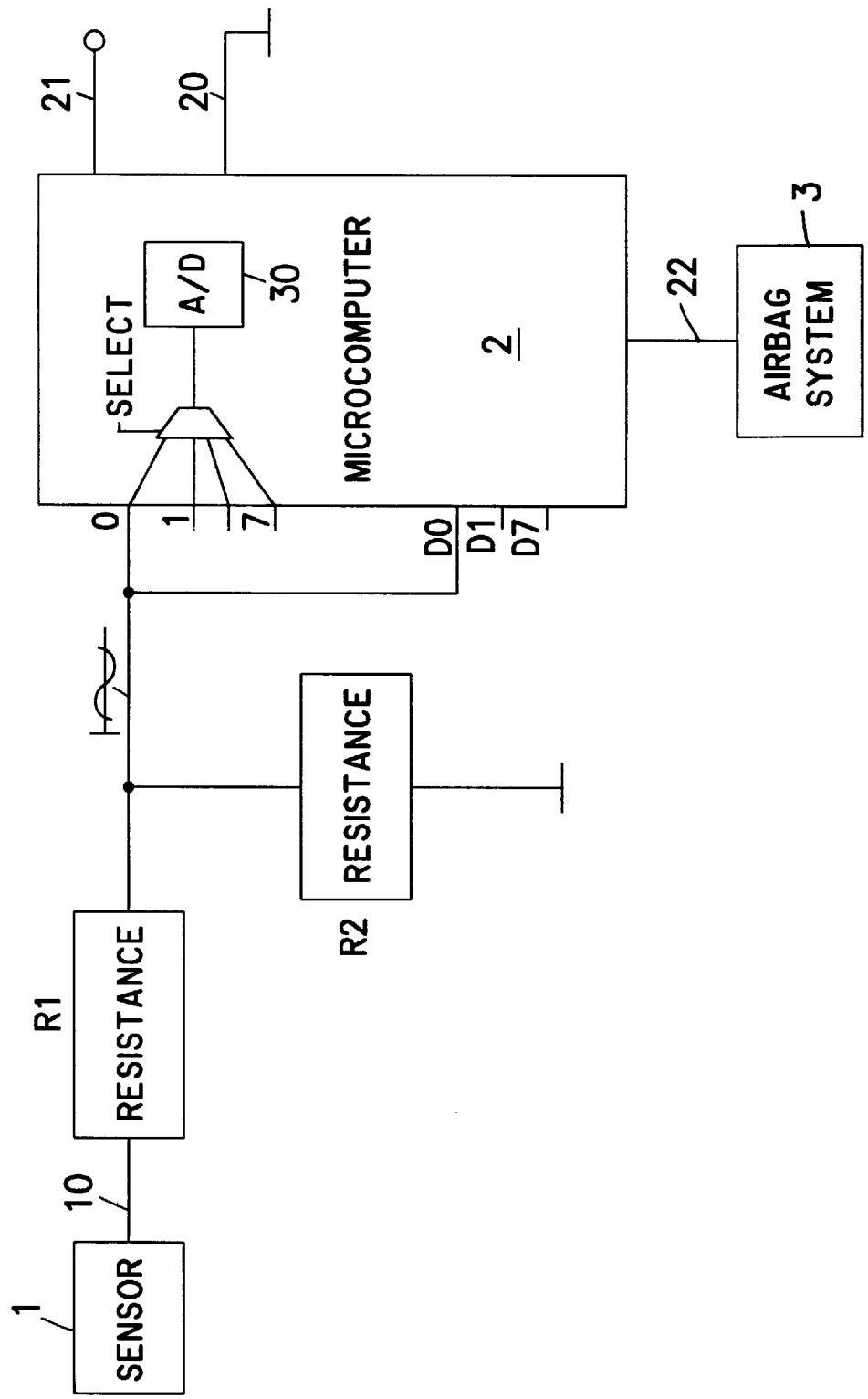
FIG. 1 shows a block diagram of the electronic device according to the present invention.
Figure 2A:
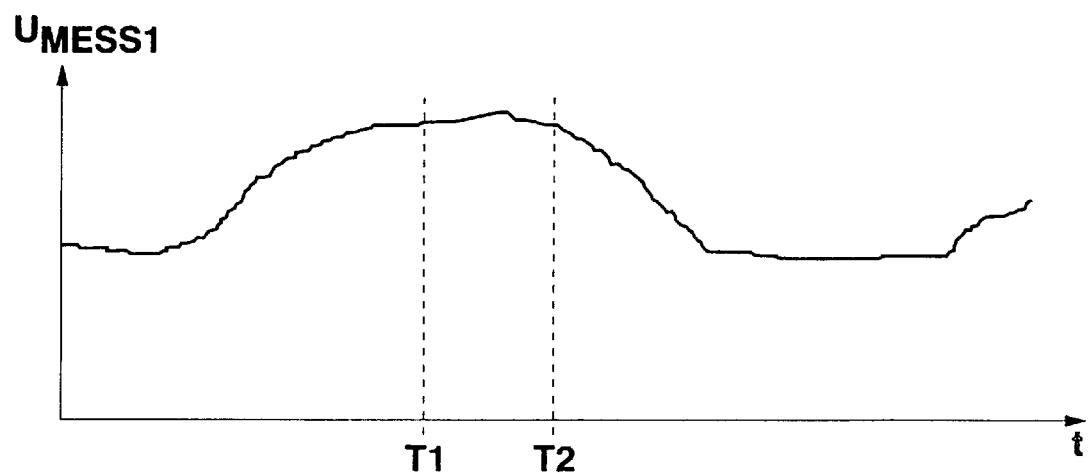
FIG. 2a shows a plot of an output signal of a sensor as a function of time for the electronic device shown in FIG. 1.
Figure 2B:
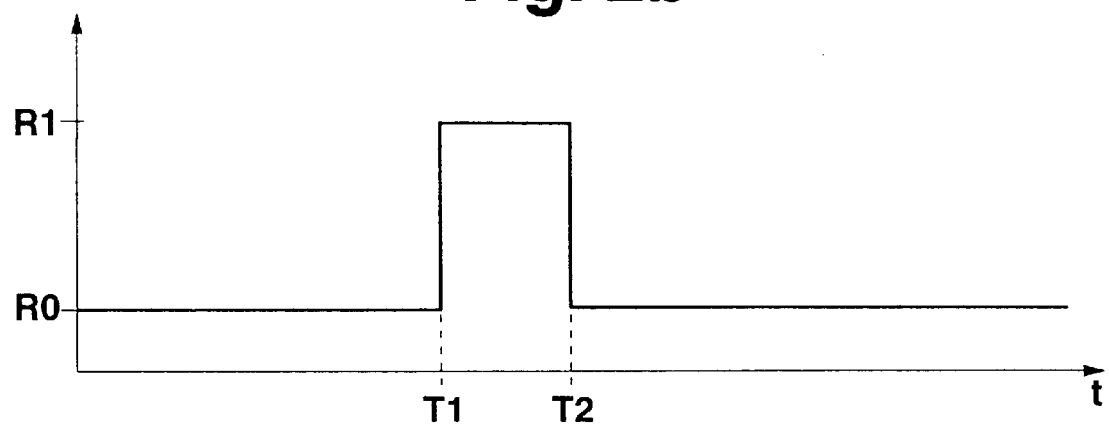
FIG. 2b shows a plot of a resistance as a function of time for the electronic device shown in FIG. 1.

An electronic device for controlling protective devices (e.g., an airbag system) for vehicle passengers, is shown, for example, as a block diagram in FIG. 1. The device includes an acceleration-sensitive sensor 1, preferably a piezoelectric sensor whose output connection is connected to a voltage divider R1, R2. The low end of voltage divider R1, R2 is connected to the ground connection. In the block diagram shown, the tap of voltage divider R1, R2 is connected to an input connection 0 of a microcomputer 2 that includes a plurality of input connections. The plurality of input connections 0 through 7 of microcomputer 2 are connected in time-multiplex fashion to the input connection of an A/D converter 30 contained in the microcomputer, which converts the analog output signals of sensor 1 into corresponding digital signals. Each of the illustrated input connections 0 through 7 can be switched with a corresponding input wiring, such as input connection 0. Consequently, a plurality of sensors 1 and a plurality of voltage dividers R1, R2 can be provided which are connected to corresponding input connections of microcomputer 2. Microcomputer 2 further comprises two reference-voltage connections 20, 21, to which reference voltages can be applied. As an example, reference-voltage connection 20 can be connected to the ground connection, while a predeterminable reference voltage can be applied to reference-voltage connection 21. An output connection 22 of microcomputer 2 is connected with at least one airbag system 3 provided for passenger protection. The output signal present at output connection 10 of sensor 1 is supplied to voltage divider R1, R2 and scaled to the detection range of the A/D converter of microcomputer 2. This detection range is, for example, in the voltage interval between 0 and 5 Volts. Thus, the actual measuring task involved in detecting the output signal of sensor 1 is fulfilled. If, however, interfering voltages occur which are superimposed over the output signal of sensor 1 and are outside of the admissible measuring interval, protective circuits in the input wiring of the A/D converter must bear this additional stress. Usually, this is possible in currently commercially-available microcomputers without resulting in the destruction of the input wiring. However, in most cases the response of the input wiring of an A/D channel, for example the channel indicated by 0 in FIG. 1, which is provided for purposes of protection, cannot guarantee that measurements can be taken on the other channels, for example channels 1 through 7, without interference. To assure extensive suppression of interference even in this situation, the input connection of the microcomputer that respectively leads to the A/D converter is configured such that it can be connected to two different potential values. The assumption here is that the output signals of sensors 1 are respectively scanned in time-multiplex or cyclical fashion so that the output signals detected during the scan time can be converted into digital signals. The operating time can thus be divided into measurement phases and inactive phases. According to the present invention, it is provided that, during the respective measuring phases, the respective input connection of microcomputer 2 is connected to a first potential, and during the respective inactive phases it is connected to a potential that is different from the first. Thus, it is ensured that interfering pulses that occur at an input connection of microcomputer 2 during an inactive phase cannot interfere with adjacent signal channels. An input connection of a microcomputer is connected, particularly simply and practically, to a respectively different potential in that it is connected to a digital port of microcomputer 2. As shown in FIG. 1, for example, input connection 0 of microcomputer 2 is additionally connected to the digital port D0 of microcomputer 2. The A/D inputs 0 through 7 of microcomputer 2 are connected in time-multiplex fashion to the input connection of the A/D converter disposed in microcomputer 2 such that each input channel 0 through 7 is connected to the input connection of the A/D converter for a predeterminable measurement time, for example 6 microseconds. This measuring process is explained in conjunction with the plots shown in FIGS. 2a and 2b. FIG. 2a shows, as an example, the output signal of sensor 1, namely the voltage $U_{MESS1}$, as a function of the time t. This output signal reaches A/D input 0 of microcomputer 2 via voltage divider R1, R2, and is scanned and converted into a corresponding digital signal during a time interval T1, T2. As can be inferred from FIG. 2b, digital port D0 of microcomputer 2 that is connected to A/D output 0 during this time interval T1, T2 is actuated such that it is in the tri-state, that is, a high-resistance state. For example, it represents a resistance R1, which is significantly greater than the resistance R0 assumed by digital port D0 of microcomputer 2 outside of time interval T1, T2. Because of the relatively low-resistance connection of A/D input 0 outside of time interval T1, T2, interfering pulses superimposed over the output signal of sensor 1 cannot lead to crosstalk and interference of the measurements at the other A/D inputs.

In one embodiment of the present invention, resistances R1, R2 of voltage divider R1, R2 each have a value of, for example, 50 KΩ. It is further assumed that an interfering voltage of ±50 Volts is superimposed over the output signal $U_{MESS1}$ of sensor 1. Outside of time interval T1, T2, digital port DO of microcomputer 2 is connected to a relatively low resistance R0 of, for example, 100 Ohms. Consequently, a maximum interfering voltage of less than 100 mV, which can no longer cause interference, is still present at A/D input 0 of microcomputer 2.

What is claimed is:

1. An electronic device comprising:

a sensor generating a first analog output signal on a sensor output line; and a microcomputer including a p lurality of A/D input lines, the sensor output line coupled to a first one of the plurality of A/D input lines, the microcomputer evaluating the first analog output signal and evaluating a second analog signal on a second one of the plurality of A/D input lines, the microcomputer further including an A/D converter converting the first analog output signal into a first digital signal and converting the second analog signal into a second digital signal, the first one of the plurality of A/D input lines having a first measurement interval, the second one of the plurality of A/D input lines having a second measurement interval, the second measurement interval being outside of the first measurement interval, wherein the first one of the plurality of A/D input lines is coupled to a first potential during the first measurement interval, and wherein the second one of the plurality of A/D input lines is coupled to a second potential during the second measurement interval.

2. The electronic device according to claim 1, wherein the first one of the plurality of A/D input lines is further coupled to at least one digital port of the microcomputer.

3. The electronic device according to claim 2, wherein each of the at least one digital port provides a first resistance during the first measurement interval and provides a second resistance less than the first resistance when outside of the first measurement interval.

4. The electronic device according to claim 1, wherein the sensor output line is coupled to the first one of the plurality of A/D input lines via at least one voltage divider.

* * * * *